(12) United States Patent
Horesh

(10) Patent No.: US 11,914,746 B2
(45) Date of Patent: Feb. 27, 2024

(54) METHODS AND SYSTEMS FOR VALIDATING SENSITIVE DATA IN A DISTRIBUTED COMPUTING SYSTEM WITHOUT EXPOSING THE SENSITIVE DATA

(71) Applicant: INTUIT INC., Mountain View, CA (US)

(72) Inventor: Yair Horesh, Kfar-Saba (IL)

(73) Assignee: INTUIT INC., Mountain View, CA (US)

( * ) Notice: Subject to any disclaimer, the term of this patent is extended or adjusted under 35 U.S.C. 154(b) by 23 days.

(21) Appl. No.: 17/239,202

(22) Filed: Apr. 23, 2021

(65) Prior Publication Data

US 2022/0343016 A1 Oct. 27, 2022

(51) Int. Cl.
G06F 21/62 (2013.01)
G06F 7/72 (2006.01)
G06F 21/60 (2013.01)

(52) U.S. Cl.
CPC .......... *G06F 21/6245* (2013.01); *G06F 7/727* (2013.01); *G06F 21/602* (2013.01)

(58) Field of Classification Search
CPC .... G06F 21/6245; G06F 21/602; G06F 7/727; G06F 7/72
See application file for complete search history.

(56) References Cited

U.S. PATENT DOCUMENTS

| 5,113,442 A | * | 5/1992 | Moir | G06F 21/6218 340/5.74 |
| 5,802,521 A | * | 9/1998 | Ziauddin | G06F 16/9014 707/999.102 |
| 11,386,227 B1 | * | 7/2022 | Harstad | G06F 16/221 |
| 2015/0212971 A1 | * | 7/2015 | Pagaime da Silva | H04L 63/0823 709/220 |
| 2016/0283731 A1 | * | 9/2016 | Chow | G06F 16/9027 |

OTHER PUBLICATIONS

Paul Kube, "CSE at UCSD Lec16", Sep. 2012; Retrieved from: https://cseweb.ucsd.edu/~kube/cls/100/Lectures/lec16/ (Year: 2012).*

* cited by examiner

*Primary Examiner* — Philip J Chea
*Assistant Examiner* — Sangseok Park
(74) *Attorney, Agent, or Firm* — Patterson + Sheridan, LLP

(57) ABSTRACT

Certain aspects of the present disclosure provide techniques for privacy preserving sharing and validation of sensitive information in a computing environment. An example method generally includes generating a hashed value of a sensitive data item. A set of modulo values is calculated for the hashed value of the first sensitive data item using a set of prime numbers between an upper bound number and a lower bound number. A request to validate the first sensitive data item is transmitted to a target computing system. The request includes the set of prime numbers and the set of modulo values. An indication of whether a match was found for each respective modulo value in the set of modulo values is received from the target computing system, and a request associated with the first sensitive data item is processed based on the indication.

20 Claims, 6 Drawing Sheets

| 999-12-3456 | 999-23-4567 | 99-34-5678 | 999-45-6789 | ─ 310

| 241 | 212 | 225 | 214 | ─ 320

─ 330

| Bucket 1: 0-10 | Bucket 2: 11-12 | Bucket 3: 13-16 | Bucket 4: 17-19 |
|---|---|---|---|
| 241 mod 11 | | 241 mod 19 | |
| 241 mod 13 | | 225 mod 19 | |
| 241 mod 17 | | | |
| 212 mod 11 | | | |
| 212 mod 13 | | | |
| 212 mod 17 | | | |
| 212 mod 19 | | | |
| 225 mod 11 | | | |
| 225 mod 13 | | | |
| 225 mod 17 | | | |
| 214 mod 11 | | | |
| 214 mod 13 | | | |
| 214 mod 17 | | | |
| 214 mod 19 | | | |
| 14 entries | 0 entries | 2 entries | 0 entries |

─ 340

Decision: Adjust Upper and Lower Bounds

FIG. 3

METHODS AND SYSTEMS FOR VALIDATING SENSITIVE DATA IN A DISTRIBUTED COMPUTING SYSTEM WITHOUT EXPOSING THE SENSITIVE DATA

INTRODUCTION

Aspects of the present disclosure relate to securely validating sensitive information in a computing environment, and more specifically to validating sensitive information in a distributed computing system such that the underlying information is not exposed to the recipient.

BACKGROUND

Generally, computing systems may use sensitive data to perform various tasks. For example, sensitive information, such as account identifiers or personal identifiers (e.g., Social Security Numbers in the United States, National Insurance Numbers in the United Kingdom, etc.), may be used in verifying the identity of a user. However, because this information is generally highly sensitive, such information is typically transmitted using various security measures. For example, the information may be encrypted using one or more cryptographic keys defined a priori or otherwise agreed upon by the transmitting and receiving parties. However, while typical encryption techniques may secure the sensitive information in transit and prevent man-in-the-middle attacks from recovering the underlying sensitive information, the sensitive data may be decrypted by the recipient computing system prior to the recipient computing system performing any activity using the sensitive information. Thus, the recipient system may be an avenue through which unauthorized disclosure of sensitive information may be performed.

To further protect against exposure or exfiltration of sensitive information in computing systems, the sensitive information may be encrypted using various homomorphic encryption schemes. In homomorphic encryption schemes, various mathematical operations may be performed on the underlying data without decrypting the underlying data. A fully homomorphic encryption scheme generally allows for any mathematical operation to be performed on encrypted data without first recovering the underlying data. Partially homomorphic encryption schemes may allow for only certain mathematical operations to be performed on encrypted data without first recovering the underlying data (e.g., addition-only schemes, multiplication-only schemes, etc.).

While homomorphic encryption schemes allow for operations to be performed on encrypted data without recovering the underlying data, homomorphic encryption schemes may impose significant performance penalties in a computing system. Generally, the complexity of calculations in homomorphic encryption schemes may increase the computation overhead for even simple mathematical operations from a constant time operation to a significantly more time-intensive operation. Further, because additional processing time may be needed to perform even simple mathematical operations on homomorphically encrypted data, operations using homomorphically encrypted data may increase power usage of computing systems on which these operations are performed.

Accordingly, techniques are needed to securely and efficiently share sensitive information in a computing system.

BRIEF SUMMARY

Certain embodiments provide a computer-implemented method. The method generally includes generating a hashed value of a sensitive data item. A set of modulo values is calculated for the hashed value of the first sensitive data item using a set of prime numbers between an upper bound number and a lower bound number. A request to validate the first sensitive data item is transmitted to a target computing system. The request includes the set of prime numbers and the set of modulo values. An indication of whether a match was found for each respective modulo value in the set of modulo values is received from the target computing system, and a request associated with the first sensitive data item is processed based on the indication.

Still further embodiments provide a computer-implemented method. The method generally includes receiving, from a requesting computing system, a request to validate a sensitive data item. The request generally includes a set of modulo values associated with the sensitive data item and a reference set of prime numbers. A reference set of modulo values is generated based on a set of sensitive data items and the reference set of prime numbers. For each respective set of modulo values in the reference set, it is determined whether a match exists between the respective set of modulo values and the set of modulo values included in the request. In response to the request to validate the sensitive data item, an indication of whether a match exists between one of the sets of modulo values in the reference set of modulo values and the set of modulo values included in the request is transmitted to the requesting computing system.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

FIG. 3 illustrates an example of selecting the upper bound and lower bound numbers between which prime numbers are selected for use in calculating modulo values.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
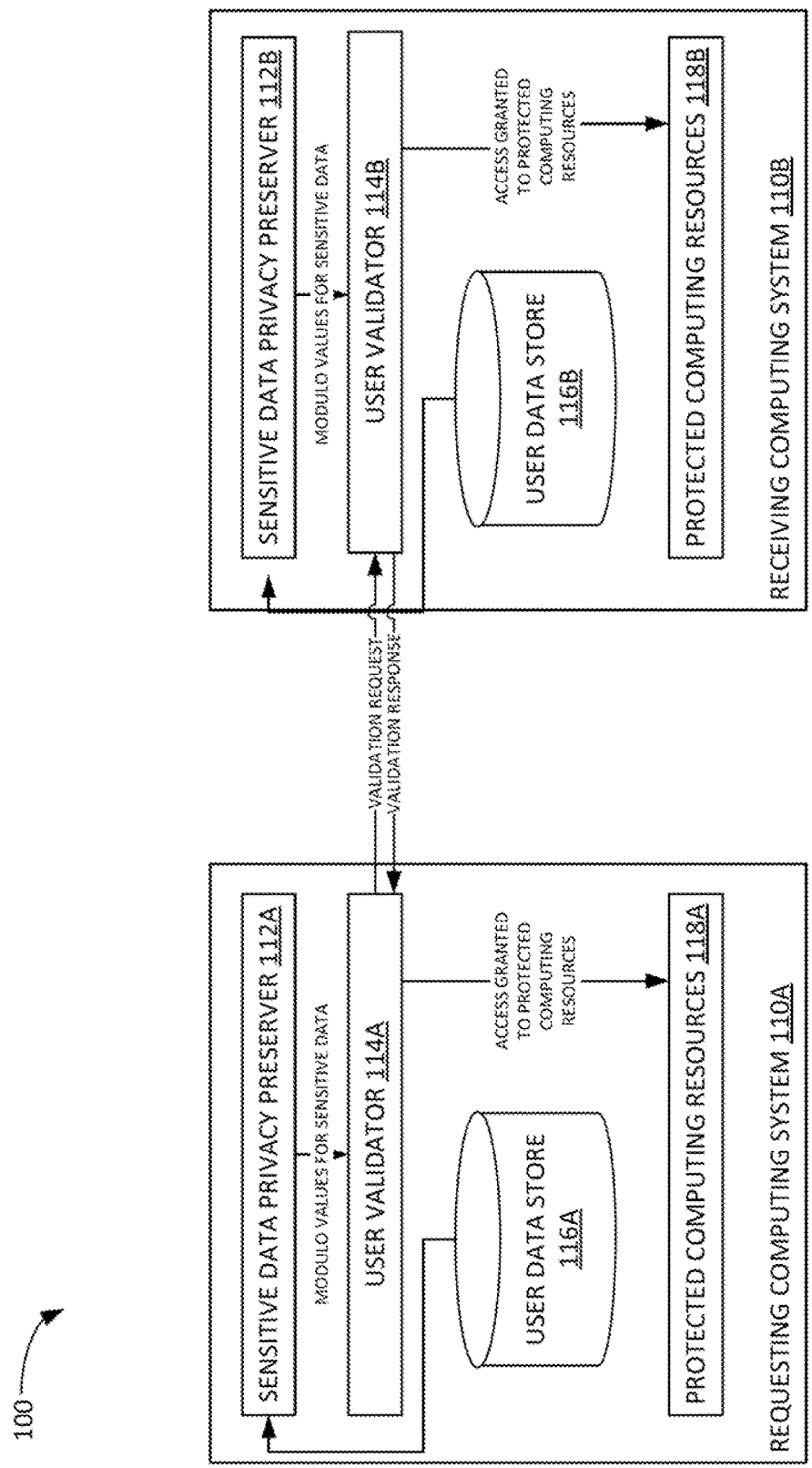
FIG. 1 depicts an example computing environment in which modulo values associated with sensitive data items are used to validate the sensitive data items such that the privacy of the sensitive data items is preserved.

In distributed computing systems, users may maintain accounts with multiple service providers. Because users maintain accounts with multiple service providers, information from one provider may be used to validate user information for other service providers with which the user maintains an account. For example, a user may maintain accounts with multiple service providers using the same computers (e.g., associated with the same or similar Internet Protocol (IP) addresses), the same contact information (e.g., e-mail addresses, telephone numbers, etc.), the same linked bank or payment account numbers, and, more generally, the same personally identifying information. Because legitimate users typically use the same information across multiple service providers, the presence of this information may be leveraged in fraud or anomaly detection systems to determine whether a user is, in fact, a legitimate user. Further, the absence of this information may indicate that a user is potentially a fraudulent user and that further examination of the user may need to be undertaken before granting the user access to a computing system.

While the use of common personally identifying information can be leveraged to determine whether a user of a computing system provided by a given service provider is legitimate, service providers generally are required to take steps to prevent the leakage of personally identifying information or other sensitive information. This personally identifying information generally includes any sort of information that can be used to identify a specific person, such as information identifying a computer used by the specific person, that person's contact information, unique identifier numbers, or the like. While this information may be encrypted in transit, the decryption of personally identifying information or other sensitive information prior to use at a receiving computing system may allow for malicious parties to exfiltrate that personally identifying information and/or other sensitive information and use such information for potentially malicious ends.

Aspects of the present disclosure provide techniques for validating sensitive information, such as personally identifying information, in a privacy-preserving manner such that the receiving computing system is not aware of the underlying data from which the shared sensitive information is generated. In sharing the sensitive information, data may be derived from the sensitive information to be shared using hashing and modulo division, and the derived data can be shared across computing system for use in validating the sensitive information. By doing so, sensitive information can be shared, allowing for cross-verification of user identity information across service providers without exposing the underlying data at any point in the comparison process. Further, because comparison operations may be performed on unencrypted (though scrambled) data, processing overhead typically incurred through the use of other privacy preserving techniques such as homomorphic encryption may be reduced or eliminated. This may save processing cycles involved in validating data, which may reduce power consumption, improve battery life of mobile devices on which these processes may execute, and the like. Thus, aspects of the present disclosure may maintain the privacy of sensitive information while reducing the processing overhead needed to maintain the privacy of the sensitive information, which may accelerate the process of validating the sensitive information and provide for more efficient use of computing resources in a computing system.

Example Privacy-Preserving Sharing and Validation of Sensitive Information

FIG. 1 illustrates a distributed computing environment 100 in which modulo values associated with sensitive data items are used to validate the sensitive data items such that the privacy of the sensitive data items is preserved and validation may be performed in a resource-efficient manner. As illustrated, computing environment 100 includes a requesting computing system 110A and a responding computing system 110B. Requesting computing system 110A and responding computing system 110B are generally representative of computing systems provided by various service providers and may be hosted on one or more physical or virtual computing instances.

Computing systems 110A and 110B generally each include a sensitive data privacy preserver 112, a user validator 114, a user data store 116, and protected computing resources 118.

Example Generation of Modulo Values for a Sensitive Data Item Associated with a User Generally, sensitive data privacy preserver 112A-112B is configured to generate, for each user having data in user data store 116A-116B, a set of modulo values for sensitive data items associated with the user. A modulo value generally corresponds to the remainder of a division operation after one number is divided by another. That is, for a division operation $z=x/y$, the modulo value m is the remainder of the division operation and is a value less than y, such that $x=y*z+m$. To generate the set of modulo values, the sensitive data privacy preserver 112A-112B can generate a hashed value of a sensitive data item associated with the user. The hashed value may be generated using a variety of cryptographic hashing algorithms, such as SHA-256, MD5, or other one-way algorithms that can be used to generate a representation of an input from which the input cannot be recovered. The hashed value may be a bitstream having a length defined by the cryptographic hashing algorithm used to generate the hashed value, and the bitstream may be treated as a numerical value for use in generating modulo values associated with the sensitive data item, as discussed in further detail below. For example, where the hashed value is generated using the SHA-256 algorithm, the hashed value may be treated as a 256-bit integer from which a set of modulo values may be calculated.

After the hashed value is generated for the sensitive data item, sensitive data privacy preserver 112A-112B calculates a set of modulo values for the hashed value. The set of modulo values may be calculated using a set of prime numbers defined a priori between an upper bound number and a lower bound number. For example, the set of prime numbers may include prime numbers between 1,000 and 2,000. Thus, the set of modulo values may be calculated as the modulus of the hashed value and each prime number between the upper bound number and the lower bound number.

In some aspects, modulo values calculated from hashed values for each of a plurality of sensitive items in a historical set of sensitive items may be organized into one of a plurality of buckets to determine the upper bound number and the lower bound number used in determining the prime numbers in the set of prime numbers. Each bucket may be defined based on the prime numbers in a set of prime numbers. For example, given a set of prime numbers {x, y, z}, where 0<x<y<z, the buckets may be defined as a first bucket for modulo values between 0 and x−1; a second bucket for modulo values between x and y−1; and a third bucket for modulo values between y and z−1. For each sensitive item and prime number, the resulting modulo value may be placed in the appropriate bucket. That is, for a given hashed value hash(id), a prime number p, and the set of prime numbers {x, y, z}, hash(id) % p may map to one of the first bucket, the second bucket, or the third bucket.

To determine the upper bound and lower bound numbers from which the set of prime numbers are selected, the number of hashed values from the historical set of sensitive items in each bucket may be compared to a threshold value. If the number of hashed values in a threshold number of buckets is below a bucket lower bound size or above a bucket upper bound size, the upper bound and lower bound numbers may be adjusted accordingly.

In one example, if more than half the number of buckets include less than 10% of the number of items in the historical set of sensitive items, sensitive data privacy preserver 112A-112B may adjust the upper and lower bound numbers to be closer to each other. The upper and lower bound numbers may be adjusted such that the number of prime numbers between the adjusted upper and lower bound numbers is less than the number of prime numbers between the unadjusted upper and lower bound numbers. By doing so, sensitive data privacy preserver may reduce the number of buckets into which modulo values may be mapped.

In another example, if more than half the number of buckets include more than 90% of the number of items in the historical set of sensitive items, sensitive data privacy preserver 112A-112B can adjust the upper and lower bound numbers to be further away from each other, thereby increasing the number of buckets into which modulo values may be mapped. In both of these cases, the number of buckets may be adjusted so that a sufficient number of unique modulo values are generated for each prime number and to minimize the likelihood that modulo values calculated for a plurality of prime numbers will map to a same value.

In some aspects, in determining the upper and lower bound numbers from which the set of prime numbers is selected, a default number of prime numbers may be defined a priori. The upper and lower bound numbers may be adjusted to increase or decrease the number of prime numbers included in the set of prime numbers. For example, the upper and lower bound numbers may be adjusted so that each bucket includes modulo values for roughly half of the sensitive items in the historical set of sensitive items, which may ensure that a sufficient number of unique, non-colliding modulo values exist for each sensitive data item to be validated, as discussed in further detail below.

User validator 114A-114B generally receives and processes requests to validate sensitive data items and takes one or more actions to process a request associated with a sensitive data item based on the results of a validation process.

Example Validation of Sensitive Information Using Modulo Values

User validator 114A hosted on a requesting computing system 110A generally transmits a request to a target computing system to validate a sensitive data item. Generally, the request includes a set of prime numbers and a set of modulo values calculated for the sensitive data item. The set of prime numbers included in the request may be the set of prime numbers identified and used by sensitive data privacy preserver 112 to generate the modulo values for the sensitive data item. The set of modulo values included in the request may be the modulo values calculated based on the hashed value generated for the sensitive data item and each prime number in the set of prime numbers.

In response, user validator 114A hosted on the requesting computing system 110A receives an indication of whether a match was found for each modulo value in the set of modulo values. If the indication indicates that a match was found for each modulo value in the set of modulo values, user validator 114 can determine that the user associated with the sensitive data item exists and has been validated by the responding computing system 110B. Thus, the user may be considered a probable legitimate user and may be granted access to computing resources managed by the service provider associated with the requesting computing system 110A.

Generally, a response received from a user validator 114B hosted on a responding computing system 110B includes an indication of whether each modulo value in the set of modulo values was found in a user information record at the responding computing system 110B. If user validator 114B hosted on the responding computing system 110B indicates that each modulo value associated with the sensitive data item being validated was found, user validator 114A hosted on the requesting computing system 110A can determine that the user associated with the sensitive data item has an account with a service provider associated with the responding computing system 110B. Thus, the user associated with the sensitive data item may be presumed to be a legitimate (non-fraudulent) user, and user validator 114A hosted on the requesting computing system 110A can grant access to one or more protected computing resources 118A controlled by the service provider associated with the requesting computing system 110A.

In some aspects, the user validator 114A hosted on the requesting computing system 110A may generate a plurality of validation queries for the responding computing system 110B to process. The plurality of validation queries may include one validation query including the modulo values for the sensitive data item being validated and one or more validation queries including dummy data. User validator 114A may discard responses to the validation queries including the dummy data upon receipt, as the dummy data is used to conceal which query includes the real data to be validated. However, because each query includes a set of prime numbers and a set of modulo values without any additional information indicating whether the set of modulo values is a real set or a dummy data set, a user validator 114B hosted on the responding computing system 110B may not be able to distinguish which queries include real data and thus may treat each query as a query including real data to be validated.

Figure 2:
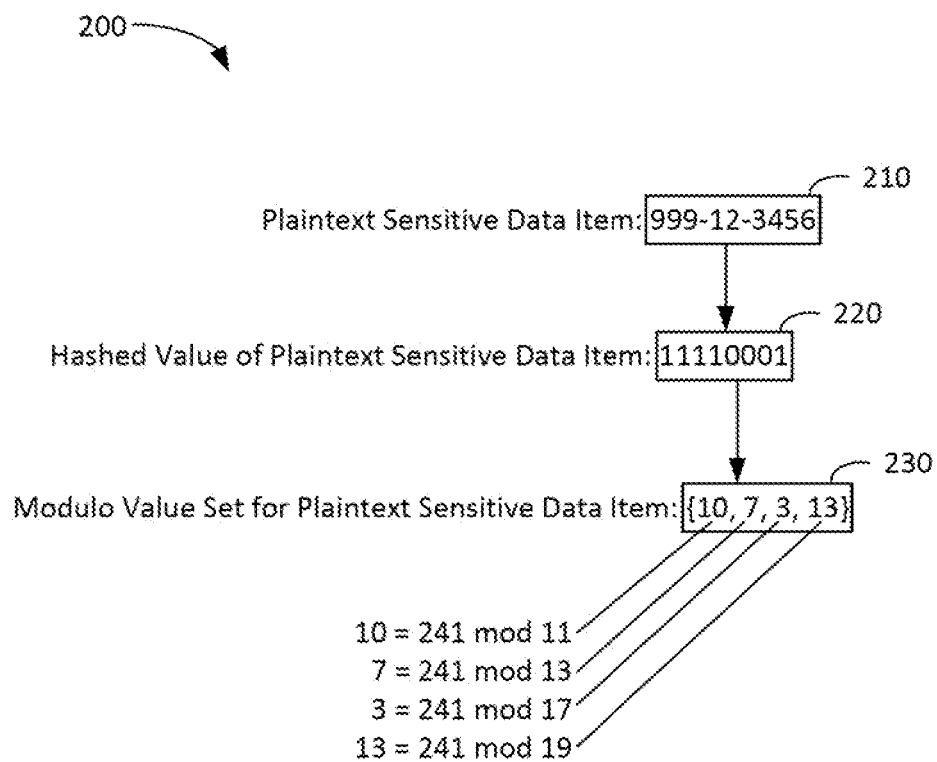
FIG. 2 illustrates an example set of modulo values generated from a plaintext version of a sensitive data item that can be used in sensitive data item validation.

A user validator 114B at a responding computing system 110B generally receives a validation request including a set of prime numbers and a set of modulo values to be matched. To process the validation request, the user validator 114B at the responding computing system 110B generates modulo values for a sensitive data item included for each of the plurality of users having data in user data store 116 based on the prime numbers included in the validation request. As discussed, the modulo values may be generated as the result of a modulo operation on a hashed value of a sensitive data item and a prime number in the set of prime numbers included in the validation request. The generated modulo values (e.g., modulo values 230 generated as illustrated in FIG. 2) may result, for each user of the plurality of users, in the generation of a set of modulo values that can be compared to the set of modulo values to output an indication of whether a match was found for the set of modulo values in the request.

Generally, a match may be identified when, for a given sensitive data item associated with a user having data in user data store 116B, the set of modulo values generated from the set of prime numbers matches the set of modulo values included in the validation request. That is, for a set of modulo values {a, b, c, d} included in the validation request, a match may be identified if the modulo values calculated from a sensitive data item associated with a user having data in user data store 116B and the set of prime numbers included in the validation request also resolves to the set of modulo values {a, b, c, d}. Thus, in this case, user validator 114B at the responding computing system 110B can indicate that an exact match was found. As discussed above, the user validator 114B at the requesting computing system 110A can use this information to grant the user access to protected computing resources 118A.

If the modulo values calculated for each of the users having data in user data store 116B each resolve to a set that is different from the set of modulo values included in the validation request (i.e., that a match was not found for at least one modulo value in the set of modulo values), user validator 114B at the responding computing system 110B can indicate that no exact match was found. As discussed above, the user validator at the requesting computing system 110A can use this indication to block access to protected computing resources 118A.

Example Modulo Value Set Generation for a Sensitive Data Item

FIG. 2 illustrates an example of generating a modulo value set for a given sensitive data item that can be used to share sensitive information while concealing and preventing the recovery of the sensitive data item.

As illustrated, a plaintext sensitive data item 210 includes personally identifiable information. While the personally identifiable information in this example is formatted as a Social Security Number, it should be recognized that the techniques described herein are applicable to any sort of personally identifiable information. As illustrated, the plaintext sensitive data item 210 has the value "999-12-3456."

A hashed value 220 may be generated using various hashing algorithms. For the sake of illustration, a simple hashing algorithm is used to generate a hash of plaintext sensitive data item 210, resulting in the bitstream "11110001," which in decimal equates to the unsigned integer value '241'. However, it should be recognized that more complex hashing algorithms, resulting in longer and more robust hashed values, can be used to generate the hashed value 220 from which the set of modulo values is to be generated.

As illustrated in FIG. 2, a set of ten prime numbers are used to generate the set of modulo values 230 associated with the plaintext sensitive data item 210. In this example, the set of prime numbers is the set {11, 13, 17, 19}. The resulting set of modulo values 230 is thus {10, 7, 3, 13}.

Example Upper Bound and Lower Bound Selection Based on Modulo Buckets

FIG. 3 illustrates an example of selecting the upper bound and lower bound numbers between which prime numbers are selected for use in calculating modulo values.

As illustrated, a data set 310 for which prime numbers may be selected includes four data points: the Social Security Numbers "999-12-3456," "999-23-4567," "999-34-5678," and "999-45-6789." A hashing algorithm may be used to generate a hashed data set 320 from the data set 310. Within the hashed data set 320, a hash of each value in the data set 310 may be generated. In this example, the application of a hashing algorithm results in the generation of bitstreams "11110001," "11010100," "11100001," and "11010110," respectively, which in decimal equates to the unsigned integer values 241, 212, 225, and 214.

To determine whether the upper bound and lower bound numbers between which prime numbers are selected, modulo values can be calculated from the values in hashed data set 320 and prime numbers between the upper and lower bound numbers. Each modulo value generated can be assigned to one of a plurality of buckets, as illustrated in bucket distribution 330. As illustrated, the modulo values illustrated in bucket distribution 330 may be calculated from the prime numbers between 10 and 20 (i.e., the numbers 11, 13, 17, and 19).

In this example, the prime numbers between 10 and 20 may result in the generation of four buckets: a first bucket for modulo values between 0 and 10, a second bucket for modulo values between 11 and 12, a third bucket for modulo values between 13 and 16, and a fourth bucket for modulo values between 17 and 19. The first bucket includes fourteen of the sixteen modulo values, and the third bucket includes the remaining two of the sixteen modulo values. To determine whether the upper bound and/or lower bound values are to be adjusted, as discussed above, a computing system can determine whether a threshold number of buckets include less than a first threshold number of entries or whether a threshold number of buckets include greater than a second threshold number of entries. In this case, the system can determine that the upper bound and lower bound numbers should be adjusted when at least half of the number of buckets either include fewer than 10 percent of the calculated modulo values or greater than 90 percent of the modulo values. Because two buckets of the four buckets—that is, 50 percent of the buckets—include fewer than 10 percent of the calculated modulo values, decision 340 may result. Decision 340 may be that one or both of the upper and lower bounds should be adjusted (e.g., to expand the number of prime numbers in the set of prime numbers, and thus to increase the number of buckets into which modulo values can be assigned).

Figure 4:
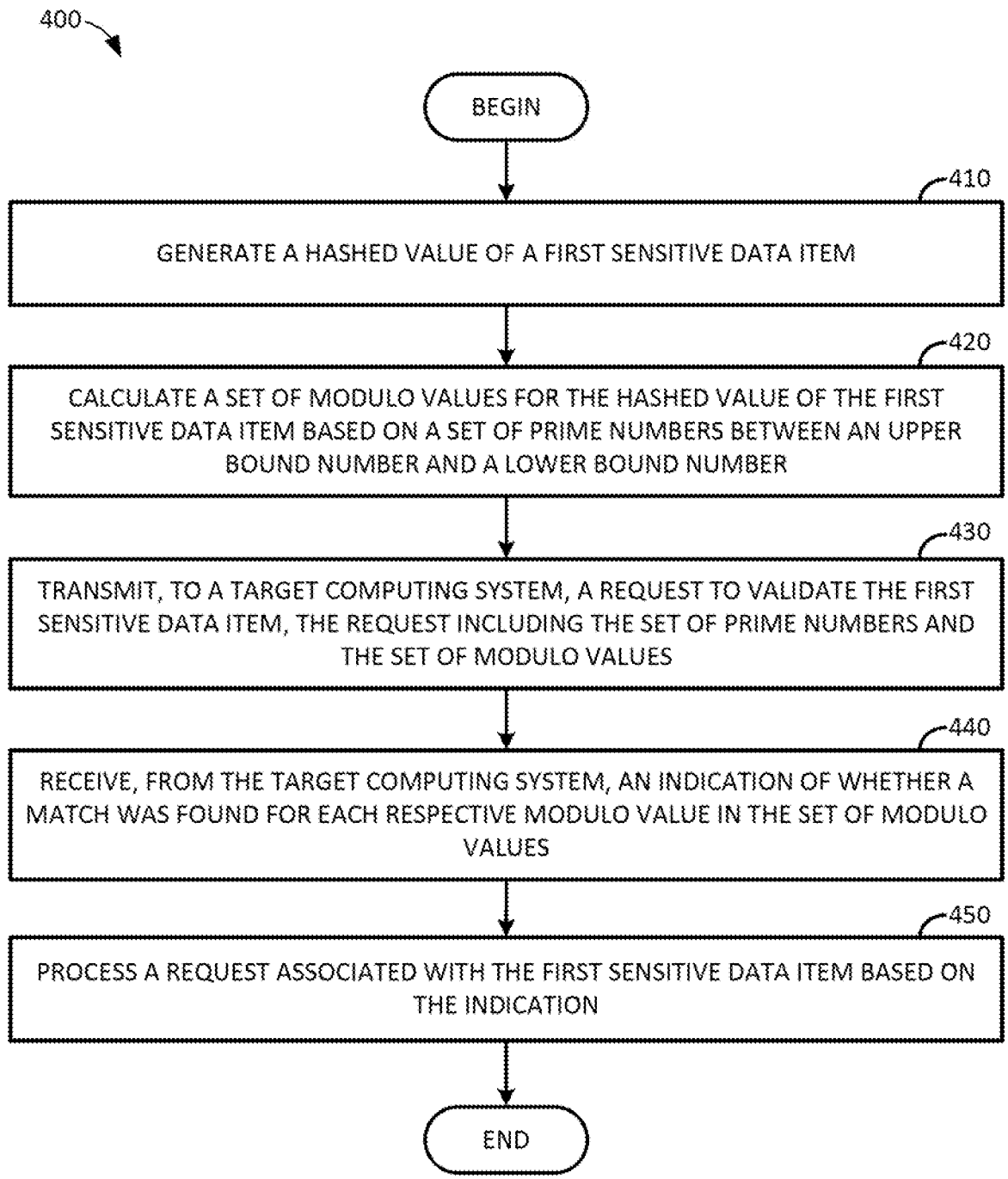
FIG. 4 illustrates example operations for processing requests in a computing system based on validation of sensitive data items using modulo values associated with the sensitive data items and a set of prime numbers.

Example Computer-Implemented Methods for Privacy-Preserving Sharing and Validation of Sensitive Information FIG. 4 illustrates example operations 400 that may be performed by a computing system for privacy-preserving sharing and validation of sensitive information, as discussed herein. Operations 400 may be performed, for example, by a sensitive data privacy preserver 112 and user validator 114 illustrated in FIG. 1.

As illustrated, operations 400 begin at block 410 with generating a hashed value of a first sensitive data item.

The hashed value of the first sensitive data item may be generated using a variety of hashing algorithms, such as cryptographic hashing algorithms, checksum generation algorithms, or other one-way algorithms. Generally, the hashed value of the first sensitive data item may be a value that is derived from the first sensitive data item but from which it is computationally difficult to recover the value of the first sensitive data item.

Operations 400 may continue with block 420, with calculating a set of modulo values for the hashed value. Generally, the set of modulo values for the hashed value may be calculated based on a set of prime numbers between an upper bound number and a lower bound number.

In some aspects, the system can select the upper bound number and the lower bound number based on hashed values of a historical set of sensitive data items for each of a plurality of prime numbers between the upper bound number and the lower bound number. To select the upper bound number and the lower bound number, the system can generate a set of hashed value buckets for each prime number between a first upper bound number and a first lower bound number. For each historical sensitive data item in the historical data set of historical data items, and for each respective prime number between the first upper bound number and the first lower bound number, a respective modulo value may be calculated based on a hashed version of the historical sensitive data item. A hashed sensitive data item is assigned to a hashed value bucket in the set of hashed value buckets. The system determines that a threshold number of hashed value buckets in the set of hashed value buckets have fewer than a minimum number of hashed historical sensitive data items or more than a maximum number of hashed historical sensitive data items. Based on this determination, the system selects a second upper bound number as the upper bound number and a second lower bound number as the lower bound number.

Generally, the range between the second upper bound number and the second lower bound number may be selected based on whether a threshold number of hashed value buckets in the set of hashed value buckets have fewer than a minimum number of hashed historical sensitive data items or more than a maximum number of hashed historical sensitive data items. If more than the threshold number of hashed value buckets in the set of hashed value buckets have fewer than a minimum number of hashed historical data items, the system can treat this as an indication that there are too many prime numbers in the set of prime numbers and may thus select the set of prime numbers from a smaller range of numbers (e.g., where the second upper bound number and the second lower bound number are closer together). If, however, more than the threshold number of hashed value buckets in the set of hashed value buckets have greater than a maximum number of hashed historical data items the system can treat this as an indication that there are too few prime numbers in the set of prime numbers and may thus select the set of prime numbers from a larger range of numbers (e.g., where the second upper bound number and the second lower bound number are further apart).

In some aspects, the set of modulo values may include one or more modulo values calculated for the hashed value of the first sensitive data item and modulo values for one or more dummy data items used to disguise an identity of the first sensitive data item. By including dummy data items in the set of modulo values, the privacy of the first sensitive data item may be preserved. The receiving system that processes a request including the set of modulo values may not be able to identify which modulo values included in the request are values calculated from the hashed value of the first sensitive data item and which modulo values are dummy values, which may further frustrate attempts to recover the underlying first sensitive data item being validated.

The dummy data items may be selected using a variety of techniques. Generally, the number of dummy data items used to pad the set of modulo values may be based on the number of hashed value buckets generated for the set of prime numbers between the upper bound number and the lower bound number. In one example, the number of dummy data items may be some multiple of the number of hashed value buckets. Generally, the dummy data items may have values different from the values in the set of modulo values.

In one example, the one or more dummy data items may include values generated from one or more mutations of the sensitive data item for which validation is sought. In one example, the one or more mutations of the sensitive data item may include a hashed value of the hashed value of the sensitive data item. In another example, one or more mutations of the sensitive data item may be the result of one or more bit permutation operations on a bistream representing the hashed value of the sensitive data item, such as a cyclic shift (e.g., a shift where each bit is shifted by n positions, and some bits are shifted from an end of the bitstream to the beginning of the bitstream), block permutation, or the like.

In another example, the dummy data items may be selected as modulo values generated for one or more other sensitive data items in a sensitive data item set. For example, the dummy data items may be the modulo values calculated for a sensitive data item associated with a different user. In another example, the dummy data items may be the modulo values calculated for a different sensitive data item associated with the same user as the sensitive data item for which validation is being sought.

Operations 400 may continue with block 430 with transmitting, to a target computing system, a request to validate the first sensitive data item.

Generally, the request includes the set of prime numbers and the set of modulo values. In some aspects, the first sensitive data item may include personally identifiable information, the privacy and security of which should be preserved. By transmitting the set of modulo values for the hashed value of the first sensitive data item, the system may be configured to prevent the target computing system from recovering the personally identifiable information. The personally identifiable information may not be recovered, for example, because the modulo values represent a remainder of a mathematical operation from which the hashed value cannot be recovered, and the hashed value generally is the result of a one-way function from which the original value cannot be recovered.

Operations 400 may continue with block 440 with receiving, from the target computing system, an indication of whether a match was found for each respective modulo value in the set of modulo values.

As discussed, the indication may indicate whether an exact match was found to the calculated set of modulo values for the set of prime numbers included in the request. If no exact match was found to the calculated set of modulo values, the indication may resolve to binary false; otherwise, if an exact match was found, the indication may resolve to binary true.

Operations 400 may continue with block 450 with processing a request associated with the first sensitive data item based on the indication.

In some aspects, processing the request associated with the first sensitive data item includes granting access to one or more protected computing resources based on the indication indicating that a match was found for each modulo value in the set of modulo values. Processing the request associated with the first sensitive data item may also or alternatively include blocking access to one or more protected computing resources based on the indication indicating that a match was not found for at least one modulo value in the set of modulo values.

Figure 5:
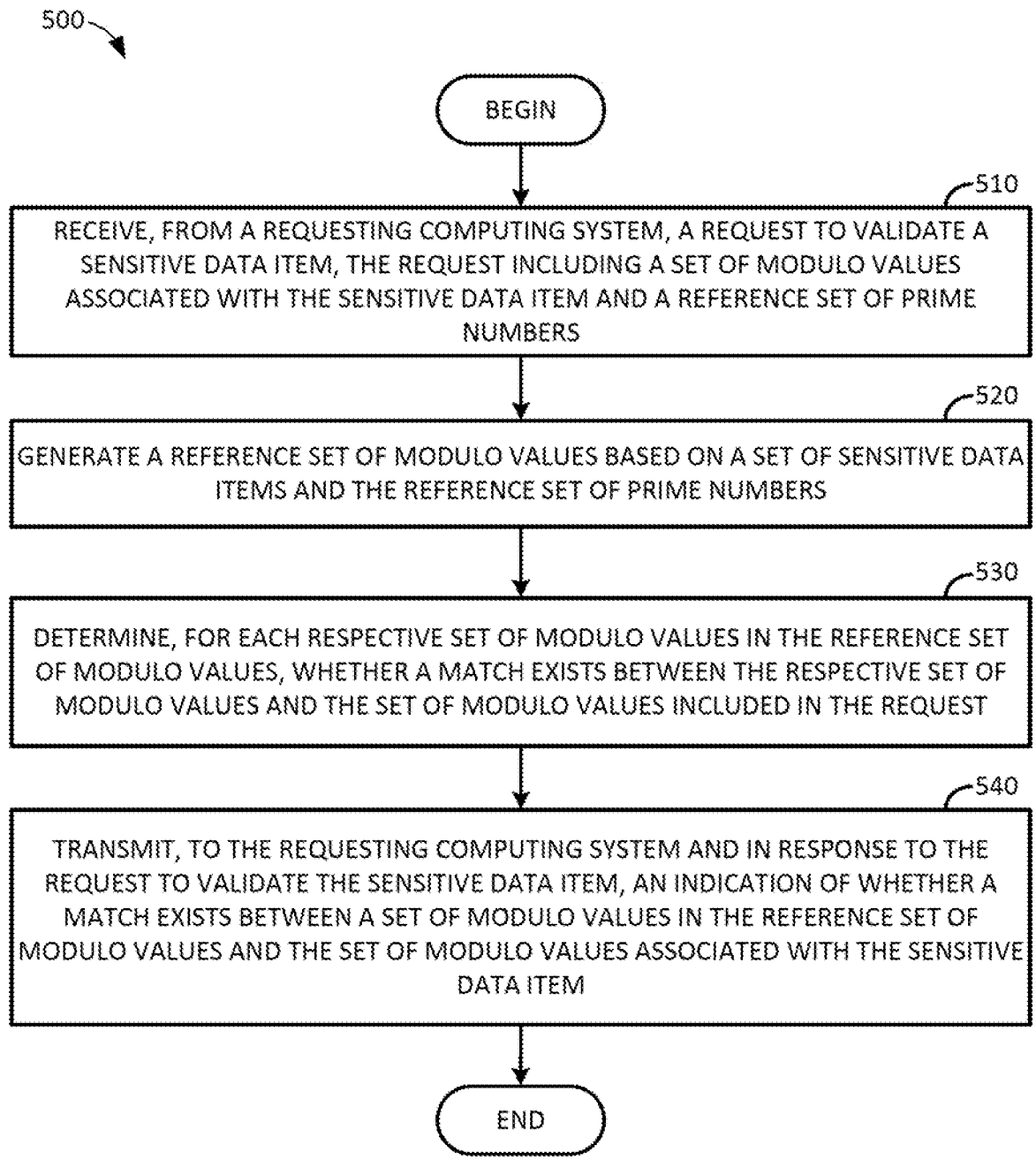
FIG. 5 illustrates example operations for validating a sensitive data item based on a set of modulo values and a set of prime numbers

FIG. 5 illustrates example operations 500 that may be performed by a computing system to validate a sensitive data item based on a set of modulo values and a set of prime numbers. Operations 500 may be performed, for example, by user validator 114 illustrated in FIG. 1.

As illustrated, operations 500 may begin at block 510, with receiving, from a requesting computing system, a request to validate a sensitive data item. The request generally includes a set of modulo values associated with the sensitive data item and a reference set of prime numbers.

Operations 500 may continue with block 520 with generating a reference set of modulo values based on a set of sensitive data items and the reference set of prime numbers.

Generally, the reference set of modulo values may include a set of modulo values for each sensitive data item in the set of sensitive data items. The set of sensitive data items may include sensitive data associated with each of a plurality of users of one or more services provided by the computing system. To generate the reference set of modulo values, the system can generate a hashed value of each respective sensitive data item in the set of sensitive data items. For each respective sensitive data item, a set of modulo values may be generated by calculating the modulus of the hashed value of the respective sensitive data item and each prime number in the reference set of prime numbers.

Operations 500 may continue with block 530 with determining, for each respective set of modulo values in the reference set of modulo values, whether a match exists between the respective set of modulo values and the set of modulo values included in the request.

Generally, a match exists where each value in the respective set of modulo values is also present in the set of modulo values included in the request, and no values in the set of modulo values included in the request are absent from the respective set of modulo values.

Operations 500 may continue with block 540, the system transmits, to the requesting computing system and in response to the request to validate the sensitive data item, an indication of whether a match exists between a set of modulo values in the reference set of modulo values and the set of modulo values associated with the sensitive data item.

As discussed, if a match does exist, the requesting computing system can grant access to protected computing resources. Otherwise, the requesting computing system can deny access to protected computing resources and may take one or more other actions to validate the user and/or prevent the user from using the protected computing resources until further validation is performed.

Figure 6:
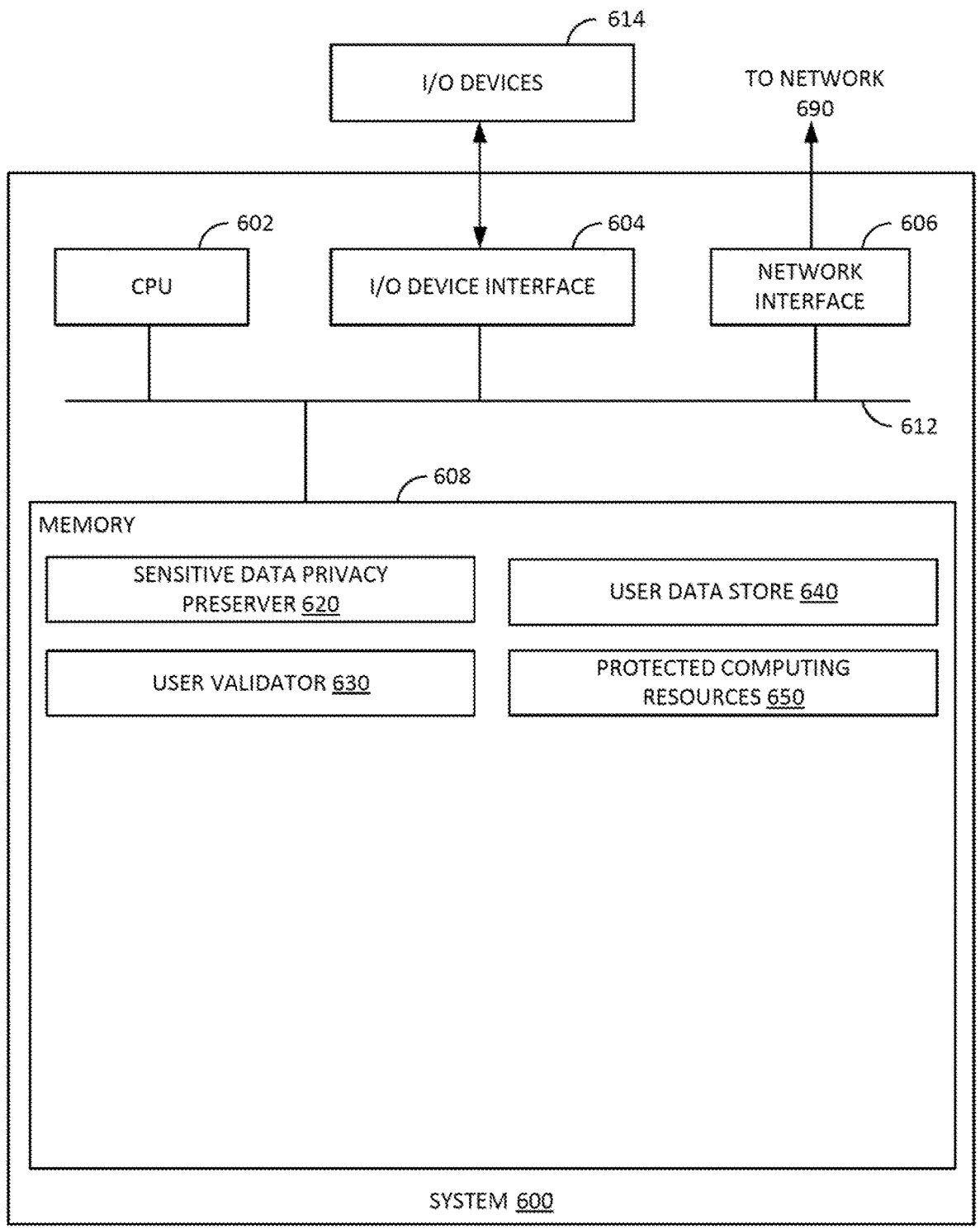
FIG. 6 illustrates an example system on which embodiments of the present disclosure can be performed.

Example System for Privacy-Preserving Sharing and Validation of Sensitive Information Using Modulo Values and Prime Numbers FIG. 6 illustrates an example system 600 that shares and validates sensitive information using modulo values and prime numbers. For example, system 600 may comprise a computing system 110A or 110B illustrated in FIG. 1.

As shown, system 600 includes a central processing unit (CPU) 602, one or more I/O device interfaces 604 that may allow for the connection of various I/O devices 614 (e.g., keyboards, displays, mouse devices, pen input, etc.) to the system 600, network interface 606 through which system 600 is connected to network 690 (which may be a local network, an intranet, the internet, or any other group of computing devices communicatively connected to each other), a memory 608 and an interconnect 612.

CPU 602 may retrieve and execute programming instructions stored in the memory 608. Similarly, the CPU 602 may retrieve and store application data residing in the memory 608. The interconnect 612 transmits programming instructions and application data, among the CPU 602, I/O device interface 604, network interface 606, and memory 608.

CPU 602 is included to be representative of a single CPU, multiple CPUs, a single CPU having multiple processing cores, and the like.

Memory 608 is representative of a volatile memory, such as a random access memory, or a nonvolatile memory, such as nonvolatile random access memory, phase change random access memory, or the like.

As shown, memory 608 includes a sensitive data privacy preserver 620, user validator 630, user data store 640, and protected computing resources 650. Sensitive data privacy preserver 620 may correspond to sensitive data privacy preserver 112 illustrated in FIG. 1 and may generate, for a sensitive data item associated with a user of protected computing resources 650 (or other computing services provided by a service provider hosting system 600), a set of modulo values representing the sensitive data item. The set of modulo values may be generated based on a hashed value of the sensitive data item (which may be stored in user data store 640, which may correspond to user data store 116 illustrated in FIG. 1) and a set of prime numbers between an upper bound number and a lower bound number (e.g., all prime numbers between values x and y). The upper bound number and the lower bound number may be defined a priori or dynamically adjusted based on distribution statistics of modulo values within different buckets corresponding to the prime numbers between the upper bound number and the lower bound number.

User validator 630 may correspond to user validator 114 illustrated in FIG. 1. Generally, the functionality of user validator 630 may be based on whether user validator 630 is used to request validation of a user based on a sensitive data item associated with the user or is used to respond to requests to validate a user based on a set of modulo values associated with a sensitive data item and a set of prime numbers. When user validator 630 is used to request validation of a user based on a sensitive data item associated with the user, user validator 630 can transmit, to a user validator at a receiving computing system, a set of modulo values and a set of prime numbers in a request to validate the sensitive data item. Generally, to further preserve the privacy of the sensitive data item, the request may be padded with additional modulo values that are unrelated to the sensitive data item so that the receiving computing system is unable to determine which modulo values are associated with the sensitive data item and which modulo values are dummy values used to conceal the module values associated with the sensitive data item. In response, the user validator 630 receives an indication of whether a match was found for the set of modulo values included in the request. Based on the indication, the user validator 630 allows access to protected computing resources 650 (which may correspond to protected computing resources 118 illustrated in FIG. 1) or block access to protected computing resources 650.

When user validator 630 is used to validate information included in a validation request, user validator 630 generally obtains a set of sensitive data items from user data store 640 and generates a hashed value for each sensitive data item in the set of sensitive data items. User validator 630 can generate a reference set of modulo values. The reference set of modulo values generally includes a set of modulo values for each respective sensitive data item in the set of sensitive data items, and the set of modulo values may be generated based on the hashed value for the respective sensitive data item and the prime numbers included in the validation request. User validator 630 may compare the set of modulo values included in the validation request to each set of modulo values in the reference set of modulo values and determine whether a matching set exists. If a matching set exists, user validator can output a response indicating that the user associated with the modulo values included in the validation request is validated; otherwise, user validator can output a response indicating that the user associated with the modulo values included in the validation request is an unknown user.

Example Clauses

Clause 1: A method, comprising: generating a hashed value of a first sensitive data item; calculating a set of modulo values for the hashed value using a set of prime numbers between an upper bound number and a lower bound number; transmitting, to a target computing system, a request to validate the first sensitive data item, the request including the set of prime numbers and the set of modulo values; receiving, from the target computing system, an indication of whether a match was found for each respective modulo value in the set of modulo values; and processing a request associated with the first sensitive data item based on the indication.

Clause 2: The method of Clause 1, further comprising: selecting the upper bound number and the lower bound number based on hashed values of a historical set of sensitive data items for each of a plurality of prime numbers between the upper bound number and the lower bound number.

Clause 3: The method of Clause 2, wherein selecting the upper bound number and the lower bound number comprises: generating a set of hashed value buckets for each prime number between a first upper bound number and a first lower bound number; calculating, for each historical sensitive data item in the historical set of sensitive data items and each respective prime number between the first upper bound number and the first lower bound number, a respective modulo value based on a hashed version of the historical sensitive data item; assigning a hashed sensitive data item to a hashed value bucket in the set of hashed value buckets; determining that a threshold number of hashed value buckets in the set of hashed value buckets have fewer than a minimum number of hashed historical sensitive data items or more than a maximum number of hashed sensitive data items; and selecting a second upper bound number as the upper bound number and a second lower bound number as the lower bound number based on the determining that the threshold number of hashed value buckets in the set of hashed value buckets have fewer than the minimum number of hashed sensitive data items or more than the maximum number of hashed sensitive data items.

Clause 4: The method of any one of Clauses 1 through 3, wherein the set of modulo values includes one or more modulo values calculated for the hashed value of the first sensitive data item and modulo values for one or more dummy data items used to disguise an identity of the first sensitive data item.

Clause 5: The method of Clause 4, wherein the one or more dummy data items comprise one or more hashed values generated from one or more mutations of the first sensitive data item.

Clause 6: The method of Clauses 4 or 5, wherein the one or more dummy data items comprise one or more hashed values generated for one or more other sensitive data items in a sensitive data item set.

Clause 7: The method of any one of Clauses 4 through 6, wherein a number of the one or more dummy data items corresponds to a number of hashed value buckets generated for the set of prime numbers between the upper bound number and the lower bound number.

Clause 8: The method of any one of Clauses 1 through 7, wherein: the first sensitive data item comprises personally identifiable information, and transmitting the set of modulo values for a hashed value of the first sensitive data item is configured to prevent the target computing system from recovering the personally identifiable information.

Clause 9: The method of any one of Clauses 1 through 8, wherein processing the request associated with the first sensitive data item comprises granting access to one or more protected computing resources based on the indication indicating that a match was found for each modulo value in the set of modulo values.

Clause 10: The method of any one of Clauses 1 through 9, wherein processing the request associated with the first sensitive data item comprises blocking access to one or more protected computing resources based on the indication indicating that a match was not found for at least one modulo value in the set of modulo values.

Clause 11: The method of any one of Clauses 1 through 10, further comprising: receiving, from a requesting computing system, a request to validate a second sensitive data item, the second sensitive data item including a second set of modulo values and a reference set of prime numbers; generating a reference set of modulo values based on a set of sensitive data items and the reference set of prime numbers; determining, for each respective modulo value in the second set of modulo values, whether a match exists between the respective modulo value and one of a plurality of values in the reference set of modulo values; and transmitting, to the requesting computing system and in response to the request to validate the second sensitive data item, an indication, for each respective modulo value in the second set of modulo values, of whether a match exists between the respective modulo value in the second set of modulo values and one of the plurality of values in the reference set of modulo values.

Clause 12: A method, comprising: receiving, from a requesting computing system, a request to validate a sensitive data item, the request including a set of modulo values associated with the sensitive data item and a reference set of prime numbers; generating a reference set of modulo values based on a set of sensitive data items and the reference set of prime numbers; determining, for each respective set of modulo values in the reference set of modulo values, whether a match exists between the respective set of modulo values and the set of modulo values included in the request; and transmitting, to the requesting computing system and in response to the request to validate the sensitive data item, an indication of whether a match exists between a set of modulo values in the reference set of modulo values and the set of modulo values associated with the sensitive data item.

Clause 13: The method of Clause 12, wherein generating the reference set of modulo values comprises, for each sensitive data item in the set of sensitive data items: generating a hashed value of the sensitive data item; and calculating a set of modulo values for the hashed value of the sensitive data item using prime numbers in the reference of prime numbers.

Clause 14: A system, comprising: a memory having executable instructions stored thereon; and a processor configured to execute the executable instructions to perform the methods of any one of Clauses 1 through 13.

Clause 15: A system, comprising: means for performing the methods of any one of Clauses 1 through 13.

Clause 16: A computer-readable medium having instructions stored thereon which, when executed by a processor, performs the methods of any one of Clauses 1 through 13.

Additional Considerations

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   generating a hashed value of a first sensitive data item;
   calculating a set of modulo values for the hashed value using a set of prime numbers between an upper bound number and a lower bound number, wherein a number of prime numbers between the upper bound number and the lower bound number correspond to a number of buckets into which hashed values are assigned;
   transmitting, to a target computing system, a request to validate the first sensitive data item, the request including the set of prime numbers and the set of modulo values;
   receiving, from the target computing system, an indication of whether a match was found for each respective modulo value in the set of modulo values; and
   processing a request associated with the first sensitive data item based on the indication.

2. The method of claim 1, further comprising: selecting the upper bound number and the lower bound number based on hashed values of a historical set of sensitive data items for each of a plurality of prime numbers between the upper bound number and the lower bound number.

3. The method of claim 2, wherein selecting the upper bound number and the lower bound number comprises:
   generating a set of hashed value buckets for each prime number between a first upper bound number and a first lower bound number;
   calculating, for each historical sensitive data item in the historical set of sensitive data items and each respective prime number between the first upper bound number and the first lower bound number, a respective modulo value based on a hashed version of the historical sensitive data item;
   assigning a hashed sensitive data item to a hashed value bucket in the set of hashed value buckets;
   determining that a threshold number of hashed value buckets in the set of hashed value buckets have fewer than a minimum number of hashed historical sensitive data items or more than a maximum number of hashed sensitive data items; and
   selecting a second upper bound number as the upper bound number and a second lower bound number as the lower bound number based on the determining that the threshold number of hashed value buckets in the set of hashed value buckets have fewer than the minimum number of hashed sensitive data items or more than the maximum number of hashed sensitive data items.

4. The method of claim 1, wherein the set of modulo values includes one or more modulo values calculated for the hashed value of the first sensitive data item and modulo values for one or more dummy data items used to disguise an identity of the first sensitive data item.

5. The method of claim 4, wherein the one or more dummy data items comprise one or more hashed values generated from one or more mutations of the first sensitive data item.

6. The method of claim 4, wherein the one or more dummy data items comprise one or more hashed values generated for one or more other sensitive data items in a sensitive data item set.

7. The method of claim 4, wherein a number of the one or more dummy data items corresponds to a number of hashed value buckets generated for the set of prime numbers between the upper bound number and the lower bound number.

8. The method of claim 1, wherein:
   the first sensitive data item comprises personally identifiable information, and
   transmitting the set of modulo values for a hashed value of the first sensitive data item is configured to prevent the target computing system from recovering the personally identifiable information.

9. The method of claim 1, wherein processing the request associated with the first sensitive data item comprises granting access to one or more protected computing resources based on the indication indicating that a match was found for each modulo value in the set of modulo values.

10. The method of claim 1, wherein processing the request associated with the first sensitive data item comprises blocking access to one or more protected computing resources based on the indication indicating that a match was not found for at least one modulo value in the set of modulo values.

11. The method of claim 1, further comprising:
   receiving, from a requesting computing system, a request to validate a second sensitive data item, the second sensitive data item including a second set of modulo values and a reference set of prime numbers;

generating a reference set of modulo values based on a set of sensitive data items and the reference set of prime numbers;

determining, for each respective modulo value in the second set of modulo values, whether a match exists between the respective modulo value and one of a plurality of values in the reference set of modulo values; and transmitting, to the requesting computing system and in response to the request to validate the second sensitive data item, an indication, for each respective modulo value in the second set of modulo values, of whether a match exists between the respective modulo value in the second set of modulo values and one of the plurality of values in the reference set of modulo values.

12. A system, comprising:

a memory having executable instructions stored thereon; and a processor configured to execute the executable instructions to:

generate a hashed value of a first sensitive data item;

calculate a set of modulo values for the hashed value using a set of prime numbers between an upper bound number and a lower bound number, wherein a number of prime numbers between the upper bound number and the lower bound number correspond to a number of buckets into which hashed values are assigned;

transmit, to a target computing system, a request to validate the first sensitive data item, the request including the set of prime numbers and the set of modulo values;

receive, from the target computing system, an indication of whether a match was found for each respective modulo value in the set of modulo values; and process a request associated with the first sensitive data item based on the indication.

13. The system of claim 12, wherein the processor is further configured to execute the executable instructions to: select the upper bound number and the lower bound number based on hashed values of a historical set of sensitive data items for each of a plurality of prime numbers between the upper bound number and the lower bound number.

14. The system of claim 12, wherein the set of modulo values includes one or more modulo values calculated for the hashed value of the first sensitive data item and modulo values for one or more dummy data items used to disguise an identity of the first sensitive data item.

15. The system of claim 12, wherein:

the first sensitive data item comprises personally identifiable information, and the processor is configured to transmit the set of modulo values for a hashed value of the first sensitive data item such that the target computing system is prevented from recovering the personally identifiable information.

16. The system of claim 12, wherein the processor is configured to process the request associated with the first sensitive data item by granting access to one or more protected computing resources based on the indication indicating that a match was found for each modulo value in the set of modulo values.

17. The system of claim 12, wherein the processor is configured to process the request associated with the first sensitive data item by blocking access to one or more protected computing resources based on the indication indicating that a match was not found for at least one modulo value in the set of modulo values.

18. The system of claim 12, wherein the processor is further configured to execute the executable instructions to:

receive, from a requesting computing system, a request to validate a second sensitive data item, the second sensitive data item including a second set of modulo values and a reference set of prime numbers;

generate a reference set of modulo values based on a set of sensitive data items and the reference set of prime numbers;

determine, for each respective modulo value in the second set of modulo values, whether a match exists between the respective modulo value and one of a plurality of values in the reference set of modulo values; and transmit, to the requesting computing system and in response to the request to validate the second sensitive data item, an indication, for each respective modulo value in the second set of modulo values, of whether a match exists between the respective modulo value in the second set of modulo values and one of the plurality of values in the reference set of modulo values.

19. A method, comprising:

receiving, from a requesting computing system, a request to validate a sensitive data item, the request including a set of modulo values associated with the sensitive data item and a reference set of prime numbers, wherein the reference set of prime numbers comprises a set of prime numbers between an upper bound number and a lower bound number, and a number of prime numbers between the upper bound number and the lower bound number correspond to a number of buckets into which values in the set of modulo values are assigned;

generating a reference set of modulo values based on a set of sensitive data items and the reference set of prime numbers;

determining, for each respective set of modulo values in the reference set of modulo values, whether a match exists between the respective set of modulo values and the set of modulo values included in the request; and transmitting, to the requesting computing system and in response to the request to validate the sensitive data item, an indication of whether a match exists between a set of modulo values in the reference set of modulo values and the set of modulo values associated with the sensitive data item.

20. The method of claim 19, wherein generating the reference set of modulo values comprises, for each sensitive data item in the set of sensitive data items:

generating a hashed value of the sensitive data item; and calculating a set of modulo values for the hashed value of the sensitive data item using prime numbers in the reference of prime numbers.

\* \* \* \* \*